(12) United States Patent
Escuti et al.

(10) Patent No.: US 10,386,558 B2
(45) Date of Patent: Aug. 20, 2019

(54) POLARIZATION CONVERSION SYSTEMS WITH GEOMETRIC PHASE HOLOGRAMS

(71) Applicants: North Carolina State University, Raleigh, NC (US); ImagineOptix Corporation, Cary, NC (US)

(72) Inventors: Michael J. Escuti, Raleigh, NC (US); Jihwan Kim, Raleigh, NC (US); Ravi K. Komanduri, Dulles, VA (US); Erin Clark, Cary, NC (US)

(73) Assignee: ImagineOptix Corporation, Cary, NC (US)

( * ) Notice: Subject to any disclaimer, the term of this patent is extended or adjusted under 35 U.S.C. 154(b) by 837 days.

(21) Appl. No.: 14/771,058

(22) PCT Filed: Mar. 7, 2014

(86) PCT No.: PCT/US2014/021680
§ 371 (c)(1),
(2) Date: Aug. 27, 2015

(87) PCT Pub. No.: WO2014/159045
PCT Pub. Date: Oct. 2, 2014

(65) Prior Publication Data
US 2016/0011353 A1      Jan. 14, 2016

Related U.S. Application Data

(60) Provisional application No. 61/779,304, filed on Mar. 13, 2013.

(51) Int. Cl.
*G02B 5/30*    (2006.01)
*G02B 5/32*    (2006.01)
(Continued)

(52) U.S. Cl.
CPC .......... *G02B 5/32* (2013.01); *F21V 9/14* (2013.01); *G02B 5/3016* (2013.01);
(Continued)

(58) Field of Classification Search
CPC ...... G02B 5/32; G02B 5/3016; G02B 5/3083; G02B 6/0056; G02B 6/105; G02B 27/283; G02B 27/286; F21V 9/14; G03B 21/2073
See application file for complete search history.

(56) References Cited

U.S. PATENT DOCUMENTS

2002/0093718 A1    7/2002    Slack et al.
2012/0188467 A1    7/2012    Escuti et al.
2013/0027656 A1    1/2013    Escuti et al.

FOREIGN PATENT DOCUMENTS

CN    1196802 A    10/1998
CN    2906673 Y    5/2007
(Continued)

OTHER PUBLICATIONS

Patel et. al., "electrically controlled polarization-independent liquid-crystal fresnel lens arrays", optics letters, vol. 16, No. 7, 532-534.*
(Continued)

*Primary Examiner* — Robert E. Tallman
(74) *Attorney, Agent, or Firm* — Myers Bigel, P.A.

(57) ABSTRACT

A polarization conversion system includes a geometric phase element and a retarder element. The geometric phase element has optical anisotropy with local optical axis orientations that vary non-linearly in at least one dimension along a surface thereof. The retarder element is arranged to receive light output from the geometric phase element. Related systems and methods are also discussed.

30 Claims, 12 Drawing Sheets

(51) Int. Cl.
    *G02B 6/10*     (2006.01)
    *G02B 27/28*     (2006.01)
    *G03B 21/20*     (2006.01)
    *F21V 8/00*     (2006.01)
    *F21V 9/14*     (2006.01)

(52) U.S. Cl.
    CPC ......... *G02B 5/3083* (2013.01); *G02B 6/0056* (2013.01); *G02B 6/105* (2013.01); *G02B 27/283* (2013.01); *G02B 27/286* (2013.01); *G03B 21/2073* (2013.01)

(56) References Cited

FOREIGN PATENT DOCUMENTS

| | | |
|---|---|---|
| EP | 0720040 A2 | 7/1996 |
| GB | 2410339 A | 7/2005 |
| JP | 03-002732 | 1/1991 |
| JP | 2005-274847 | 10/2005 |
| KR | 10-0565884 | 3/2006 |
| KR | 1020060048078 | 5/2006 |
| WO | WO 98/52077 | 11/1998 |

OTHER PUBLICATIONS

Chinese Office Action corresponding to Chinese Patent Application No. 201480014114.X; dated Mar. 8, 2017; Foreign Text, 8 Pages, English Translation Thereof, 16 Pages.

Extended European Search Report Corresponding to European Application No. 14774568.1; dated Aug. 9, 2016; 10 Pages.

Kim et al., "Efficient and monolithic polarization conversion system based on a polarization grating", Applied Optics, vol. 51, No. 20, Jul. 10, 2012, pp. 4852-4857.

Kim et al., "Liquid Crystal Geometric Phase Holograms for Efficient Beam Steering and Imaging Spectropolarimetry", North Carolina State University, May 10, 2011, pp. 24-29, (177 pages).

Seo et al., "39.2: Polarization Conversion System Using a Polymer Polarization Grating", SID Symposium Digest of Technical Papers, vol. 42, No. 1, Jun. 1, 2011, pp. 540-543.

International Search Report and Written Opinion for PCT/US2014/021680 dated May 27, 2014, 12 pages.

International Preliminary Report on Patentability for PCT/US2014/021680 dated Jul. 30, 2015.

Japanese Office Action corresponding to Japanese Patent Application No. 2016-500806 (Foreign Text, 6 Pages, English Translation Thereof, 5 Pages) (dated Nov. 17, 2017).

\* cited by examiner

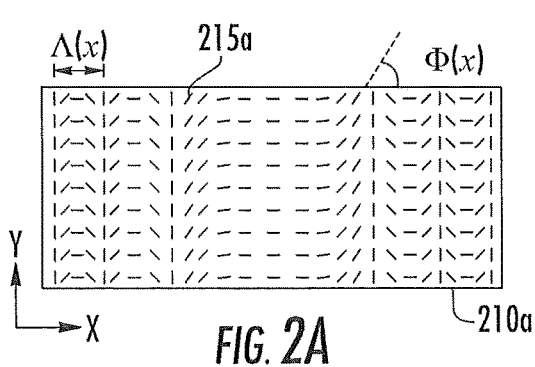
FIG. 2A
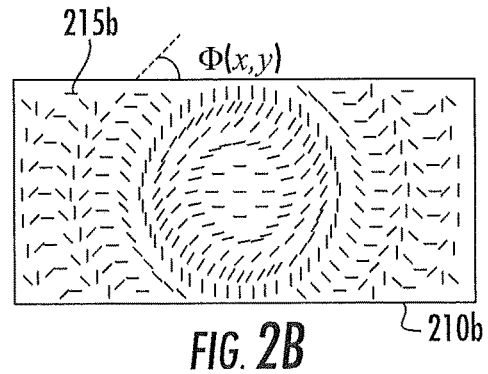
FIG. 2B
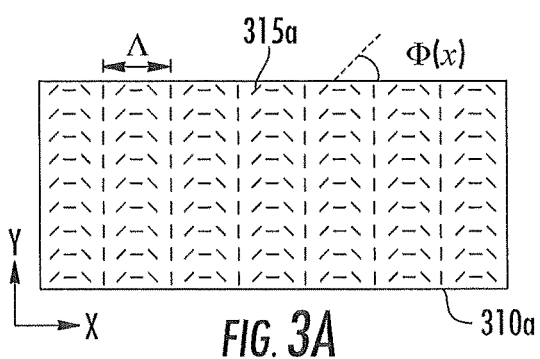
FIG. 3A
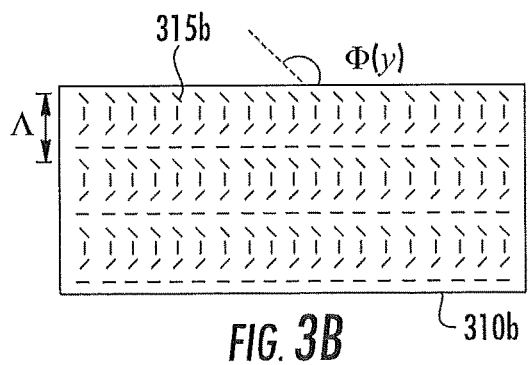
FIG. 3B
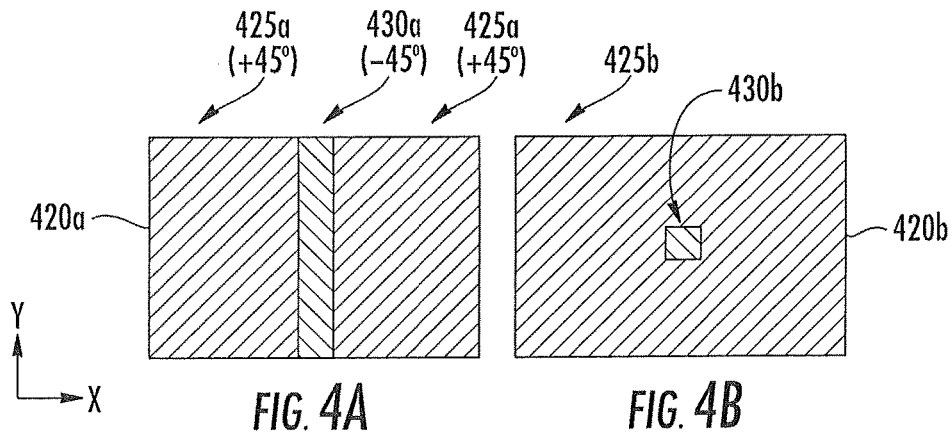
FIG. 4A
FIG. 4B TOTAL-IRRADANCE MAP FOR EXITING FLUX
NORMALIZED TO AVERAGE EMITED RADIANCE (GND AND SURFACE SOURCES)
EXIT BLOCK FRONT SURFACE TOTAL-IRRADANCE MAP FOR EXITING FLUX
NORMALIZED TO AVERAGE EMITED RADIANCE (GND AND SURFACE SOURCES)
EXIT BLOCK BACK SURFACE

POLARIZATION CONVERSION SYSTEMS WITH GEOMETRIC PHASE HOLOGRAMS

CLAIM OF PRIORITY

This application is a 35 U.S.C. § 371 national phase application of PCT International Application No. PCT/US2014/021680 having an international filing date of Mar. 7, 2014, which claims priority from U.S. Provisional Patent Application No. 61/779,304 filed on Mar. 13, 2013, the disclosures of which are incorporated by reference herein in their entireties. The above PCT International Application was published in the English language as International Publication No. WO 2014/159045 A1.

FIELD

The present invention relates to polarization conversion and related systems.

BACKGROUND

Many optical devices and systems may require polarized light for operation. Such devices may be found within diverse application areas, including for example flat-panel-displays, projection displays, optical fiber networks, and/or optical sensors. However, many light sources may be unpolarized, including for example light-emitting-diodes (LED), cold-cathode-fluorescent-lamps (CCFL), incandescent lamps, and/or natural light.

Polarizing elements, such as sheet polarizers or various birefringent prisms, can be used to convert unpolarized light to polarized light. However, such polarizing elements can be inherently lossy, since they typically operate by absorbing unwanted light or by redirecting the unwanted light away from a desired direction. This can result in greater than about 50% loss of optical power, even before the light enters the display component. Such large losses are typically undesirable, especially in high brightness display systems or portable battery-powered display systems where battery life is limited.

Some approaches have been used to reduce losses in polarizing elements so that the amount of unpolarized light that is converted to polarized light (referred to herein as "conversion efficiency") is greater than about 50%. One such approach selectively passes the desired polarization into the display and reflects the unwanted polarization back into the illumination system, with the expectation that the unwanted polarization will be scrambled or converted into desired polarization and subsequently reemitted with at least some of the desired polarization. Such an approach may preserve the etendue (or extent of spreading) of the light output from the light source.

Another approach to polarization conversion, referred to as a polarization conversion system (PCS), converts the incident light with the unwanted polarization into the desired polarization, instead of absorbing or redirecting it from the output, and is described for example in U.S. Pat. Nos. 5,995,284 and 5,986,809. This can lead to polarization conversion with typically 60-80% efficiency.

One difficulty with the PCS approach may involve the polarization-separating element. In particular, many approaches may employ an array of small polarizing beam-splitters (PBS array). Such an array may be used satisfactorily for smaller incidence angles, but can experience substantial degradation for light incident off-axis at angles of about ±5° or more. An alternative PCS described in U.S. Pat. No. 6,621,533 employs a complex combination of a blazed micro-prism array with bulk liquid crystals; however, such a complex structure may be difficult to fabricate and/or may have performance limitations.

In addition, one or more polarization gratings (PGs) have been used in combination with a mirror or a waveplate and micro-prism array to achieve polarization conversion. However, the former arrangement may require a relatively large volume, while the latter arrangement may lack practicality for all but extremely collimated light.

Also, an arrangement of two PCSs has been demonstrated that employs traditional refractive microlens arrays, a polarization grating, and a louvered wave plate. However, such configurations may present challenges with respect to fabrication and registration across relatively large areas, as they may involve at least five elements, which much be fabricated separately and carefully aligned. Furthermore, the practical limitations the size and f-number (the ratio of the focal length to the diameter of a lens) possible for microlens arrays often limit performance or increase cost.

SUMMARY

According to some embodiments described herein, an apparatus or system for polarization conversion includes a geometric phase hologram positioned to receive light output from at least one light source, and a patterned retarder positioned to receive light output from the geometric phase hologram.

In some embodiments, the light output from the light source may have an emission area smaller than an area of the geometric phase hologram.

In some embodiments, the light output from the light source may have a spectrum that is broadband.

In some embodiments, the light output from the light source may be at least partially unpolarized.

In some embodiments, the geometric phase hologram may be configured to focus one circular polarization and defocus an orthogonal circular polarization. The geometric phase hologram may thus be configured to implement a lens function in its phase profile.

In some embodiments, the patterned retarder may be positioned at or near a focal plane of the geometric phase hologram.

In some embodiments, the patterned retarder may have achromatic quarter-wave retardation.

According to some embodiments described herein, a polarization conversion system includes a geometric phase element having optical anisotropy with local optical axis orientations that vary non-linearly in at least one dimension along a surface thereof. A retarder element is arranged to receive light output from the geometric phase element.

In some embodiments, the optical anisotropy of the geometric phase element may have a constant magnitude along the surface thereof.

In some embodiments, the local optical axis orientations may define a birefringence pattern having a varying periodicity along the surface of the geometric phase element.

In some embodiments, the varying periodicity may define respective lens regions along the surface of the geometric phase element.

In some embodiments, the periodicity at a central portion of the geometric phase element may be greater than the periodicity at an edge portion of the geometric phase element.

In some embodiments, the local optical axis orientations may vary in first and second dimensions along the surface of the geometric phase element.

In some embodiments, an area of the surface of the geometric phase element may be greater than an area of illumination provided by light incident on the geometric phase element.

In some embodiments, the geometric phase element may be arranged to receive the incident light directly from an unpolarized light source without an intervening lens element therebetween.

In some embodiments, the geometric phase element may be configured to diffract at least partially unpolarized incident light into first and second divergent beams having orthogonal polarization states.

In some embodiments, the geometric phase element may further be configured to focus the first beam at a focal length associated therewith and defocus the second beam at the focal length.

In some embodiments, the retarder element may be positioned adjacent a focal length of the geometric phase element. The retarder element may be configured to convert the orthogonal polarization states of the first and second beams to a same polarization state without substantially altering respective directions of propagation thereof.

In some embodiments, the first and second beams may have orthogonal circular polarization states of opposite handedness. The retarder element may be configured to convert each of the orthogonal circular polarization states to a same linear polarization state.

In some embodiments, the retarder element may include first and second retardation regions positioned side-by-side or concentrically in a coplanar arrangement. The geometric phase element may be configured to direct the first beam to the first retardation region, and to direct the second beam to the second retardation region.

In some embodiments, an area of the first retardation region may correspond to an area of a focal spot at the focal length of the geometric phase element.

In some embodiments, the retarder element may be a quarterwave plate, and optical axes of the first and second retardation regions may be about 90° apart.

In some embodiments, one or more light sources may be arranged such that light output therefrom is incident on the geometric phase element. Each of the light sources may be aligned with one of the lens regions of the geometric phase element.

In some embodiments, the light output from the respective lens regions may define respective spots having a same polarization state at a focal plane of the geometric phase element.

In some embodiments, a polarizing element may be arranged to receive light output from the retarder element.

In some embodiments, a light guide may be arranged to receive light output from the retarder element and may be configured to maintain a polarization of the light output from a surface thereof and throughout a volume thereof.

In some embodiments, the light guide may include one or more optical structures configured to direct the light output from the retarder element therethrough while maintaining the polarization thereof.

In some embodiments, the optical structures may include prismatic structures, microlenses, and/or planar thin films.

In some embodiments, a polarization grating may be arranged between the geometric phase element and the retarder element.

In some embodiments, the retarder element may be a halfwave retarder element. A polarization grating may be positioned to receive light output from the halfwave retarder element, and a quarterwave retarder element may be positioned to receive light output from the polarization grating.

In some embodiments, a transparent spacer element may be positioned between the geometric phase element and the retarder element. The geometric phase element, the spacer element, and the retarder element may be laminated to provide a monolithic structure.

In some embodiments, the retarder element may include at least one chiral liquid crystal layer.

In some embodiments, the at least one chiral liquid crystal layer may be first and second chiral liquid crystal layers having respective molecular orientations that are rotated by different twist angles over respective thicknesses thereof. At least one of the twist angles may be non-zero.

In some embodiments, the system may be included in a projector. The projector may include a light source configured to provide at least partially collimated light incident on the geometric phase element, a microdisplay arranged to receive light output from the retarder element, and a projection lens arranged to receive light output from the microdisplay.

In some embodiments, the system may be included in a lighting unit of a direct view display. The lighting unit many include a light emitting element configured to provide unpolarized light incident on the geometric phase element, and a waveguide arranged to receive light output from the retarder element.

In some embodiments, the system may be included in a telecommunications system. The telecommunications system may include an infrared light source configured to provide infrared light incident on the geometric phase element, and an optical fiber element configured to receive light output from the retarder element.

According to some embodiments described herein, a method includes providing a geometric phase element having optical anisotropy with local optical axis orientations that vary non-linearly in at least one dimension along a surface thereof, and arranging a retarder element to receive light output from the geometric phase element.

In some method embodiments, the retarder element is arranged to receive first and second divergent beams having orthogonal polarization states from the geometric phase element.

In some method embodiments, arranging the retarder element further includes positioning the retarder element adjacent a focal length of the geometric phase element such that the orthogonal polarization states of the first and second beams are converted to a same polarization state without substantially altering respective directions of propagation thereof.

In some method embodiments, the retarder element includes different first and second retardation regions positioned side-by-side or concentrically in a coplanar arrangement, wherein the first beam is directed to the first retardation region, and wherein the second beam is directed to the second retardation region.

Some method embodiments further include arranging the geometric phase element to receive incident light directly from one or more unpolarized light sources without an intervening lens element therebetween.

In some method embodiments, the local optical axis orientations define a birefringence pattern having a varying periodicity defining respective lens regions along the surface of the geometric phase element, and each of the light sources is aligned with one of the lens regions of the geometric phase element.

Some method embodiments further include laminating the geometric phase element and the spacer element with a transparent retarder element therbetween to provide a monolithic structure.

Some method embodiments further include arranging a polarizing element to receive light output from the retarder element.

Some method embodiments further include arranging a light guide to receive light output from the retarder element, wherein the light guide is configured to maintain a polarization of the light output from a surface and throughout a volume thereof.

Some method embodiments further include arranging a polarization grating between the geometric phase element and the retarder element.

Some method embodiments further include positioning a polarization grating to receive light output from the retarder element, where the retarder element is a halfwave retarder element, and positioning a quarterwave retarder element to receive light output from the polarization grating.

Other apparatus and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIG. 2A illustrates an example of a spatially varying optical axis profile in geometric phase holograms (GPHs) for a one-dimensional lens according to some embodiments described herein, with bars indicating the local optical axis direction, and $\Phi(x)$ indicating the angle of the optical axis relative to the x-axis.

FIG. 2B illustrates an example of the spatially varying optical axis profile in geometric phase holograms (GPHs) for a two-dimensional lens according to some embodiments described herein with bars indicating the local optical axis direction, and $\Phi(x,y)$ indicating the angle of the optical axis relative to the x-axis.

FIGS. 3A and 3B illustrate examples of the spatially varying optical axis profile of a polarization grating (PG) having optical axis variation and diffraction in the x-direction and in the y-direction, respectively.

FIG. 4A illustrates an example optical axis profile for a patterned retarder with a linear region at −45° and surrounding regions with +45° optical axes, suitable, for example, for use with the one-dimensional geometric phase lens of FIG. 2A according to some embodiments described herein.

FIG. 4B illustrates an example optical axis profile for a patterned retarder with one central spot region at −45° and a surrounding region with +45° optical axes, suitable, for example, for use with the two-dimensional geometric phase lens of FIG. 2B according to some embodiments described herein.

FIG. 16A illustrates a simulation of a model geometry corresponding to the GPH-PCS arrangement of FIG. 7A, while

FIG. 17A illustrates a simulation of a model geometry corresponding to the GPH-PCS arrangement of FIG. 7A, while

DETAILED DESCRIPTION OF EMBODIMENTS

Figure 1:
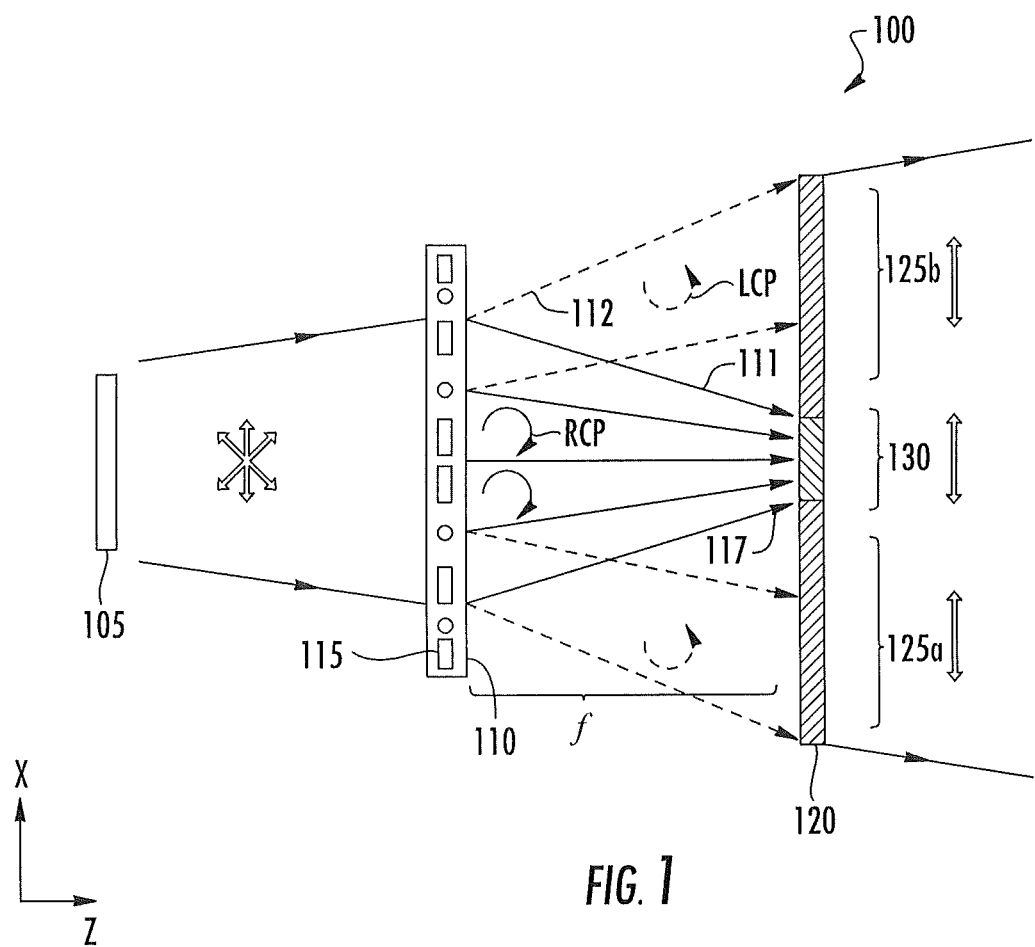
FIG. 1 illustrates a geometric phase hologram polarization conversion system (GPH-PCS) arrangement with a single light source, according to some embodiments described herein.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments of the present invention may arise from recognition that several problems with traditional PCS approaches may be attributed to the polarization-separating element. In particular, while several approaches may employ an array of small polarizing beam-splitters (also referred to as a PBS array), such approaches may experience substantial degradation in efficiency for light that is incident at larger angles (also referred to herein as "off-axis" light) with respect to the optical axis of the PBS array, beginning at ±5°. As many light sources may emit light beyond these angles, this presents a practical limitation. The PBS-array may also present challenges in fabrication, and multiple individual elements may be challenging to align with the needed precision.

Some embodiments of the present invention provide a configuration of thin optical elements, also referred to herein as a polarization conversion system (PCS), that accept unpolarized incident light (e.g., input light with diverse and unpredictable polarization) at a wider range of angles than a traditional microlens, and converts this unpolarized light into light having a substantially same or a single desired polarization with a conversion efficiency of greater than about 50%, and in some embodiments, greater than about 70%, which may be especially useful in applications such as flat-panel-displays, projection displays, optical fiber networks, and/or optical sensors.

In particular, a PCS according to some embodiments described herein may not require or otherwise include a traditional refractive microlens array. Rather, the functionality of both the lens and the polarization grating are provided by a single optical element, referred to herein as a geometric phase element. A geometric phase element is an anisotropic optical element having optical axis orientation at least partially within the x-y plane (and/or other planes or directions defined along a surface thereof), affecting the polarization of incident light in such a way as to control the geometric phase (or Pancharatnam-Berry phase). The geometric phase element may include optical axis orientations that vary in one or more dimensions and/or in any manner, including but not limited to linear, nonlinear, and continuous or discontinuous optical axis variations. In some instances, the optical axis orientations may be spatially varying within the x-y plane while the magnitude of anisotropy (i.e., birefringence or dichroism) remains constant. In such cases, elements like these may be called geometric phase holograms (GPHs), as well as other names, such as patterned retarders and Pancharatnam-Berry optical elements. Geometric phase elements as described herein can be created by various methods, including holographic interference and various other forms of lithography, and thus, a 'hologram' as described herein is not limited to creation by holographic interference, or 'holography'. Some embodiments described herein may provide an arrangement including a GPH and a patterned retarder, which together can convert unpolarized to polarized light with high conversion efficiency (for example, ≥70%), reduce fabrication complexity (due to fewer elements and interfaces therebetween), and result in a more compact (i.e., thinner) package.

Thus, embodiments described herein can provide not only a performance improvement, but can also result in a compact, thin element without its own fixture, which may be easier to integrate into other devices (such as devices having smaller volumes of enclosure). For example, embodiments described herein may be used in liquid crystal displays, portable e-reader displays, liquid crystal projection displays and systems, and/or optical fiber network elements (photonic devices). A light source for use with embodiments described herein may be partially collimated and/or smaller than the optical elements, in at least one dimension.

A GPH is a birefringent (or dichroic, or some combination of the two) optical element that can create the phase of a recorded phase profile (or its conjugate) by modulating the geometric phase, which results from a change in polarization states, rather than the dynamic phase, which results from optical path length difference effects. In particular, the GPH does not create an optical phase difference by changing the optical path length and the dynamic phase, but rather, it may introduce an optical phase difference by manipulating the polarization of an optical field and thereby the geometric phase. The GPH has an optical axis orientation angle that follows $\Phi(x)$ or $\Phi(x,y)$ along a surface thereof, which is directly proportional to the desired phase profile of the element, with a retardation that is approximately constant throughout its area. A GPH may be a particular kind of patterned retarder, with an inhomogeneous local optical axis. In some embodiments of the present invention, a non-linear variation of the local optical axis orientations as a function of position along the surface of the GPH may define a pattern having a continuously varying periodicity, such that the overall effect of the GPH may be to provide a lens effect. Although primarily described herein with reference to idealized optical axes (for example, as provided by nematic director orientations within a liquid crystal layer) as shown by elements 115, 215a/b, 315a/b, 515, 615, 715, 815, 915, 1015, 1115, and 1215 in FIGS. 1-3 and 5-12 herein), it will be understood that optical axes as described herein may more generally refer to material properties, and thus may include "effective" or "approximate" optical axes defined by the refractive indices of such materials, and should not be construed as being limited to the exact axes shown.

GPHs in accordance with embodiments described herein may be fabricated by various methods. For example, a GPH may be fabricated by recording the optical axis variation using polarization holography and photo-alignment materials. In particular, polarization holography can create spatially varying linear polarization fields with constant intensity using two-beam interference having orthogonal circular polarizations. The linear polarization fields can be recorded on the photo-alignment material, and the GPH may be embodied using a birefringent liquid crystal material having local optical axes or nematic directors that align to the optical axis variation recorded on the photo-alignment material. The resulting GPH element has a constant local retardation and a spatially varying optical axis. Some methods of fabricating GPH elements using direct write lithography are described in commonly assigned International Application No. PCT/US2013/064939, filed on Oct. 15, 2013, the disclosure of which is incorporated by reference herein.

Many optical elements can be formed as a GPH, including, but not limited to, lenses, prisms, surface-relief elements, diffractive optical elements, and micro-optics. When transformed into a GPH, their holographic versions may be thin-films, substantially more compact, and in many cases, with additional advantageous features. For example, GPH elements as described herein may provide a larger aperture or acceptance angle with respect to incident light than some traditional microlens arrays. Note that GPH are a subset of polarization holograms. Furthermore, note that polarization gratings (PG) can be seen as a particular type of GPH having optical axis orientations that vary in a linear manner.

The patterned retarder (PR) is a birefringent optical retarder element having two or more patterned regions, within each of which the optical axis is constant or uniform but different from surrounding regions, and is configured to alter the polarization state of light passing through each the region differently, as shown in greater detail in FIGS. 4A-4B. For example, the PR may be arranged to receive polarized light of different polarization states output from the GPH, and may be configured to change the different polarization states to a same polarization state. In some embodiments, the GPH, PR, and/or PG may be broadband, using for example techniques of achromatic PGs and multi-twist retarders (MTRs).

FIG. 1 illustrates a geometric phase hologram polarization conversion system (GPH-PCS) arrangement 100 with a single light source 105, according to some embodiments described herein. Referring now to FIG. 1, the GPH-PCS 100 includes a geometric phase hologram (GPH) element 110 and a patterned retarder element 120 arranged to receive light output from the GPH element 110. Light from at least one unpolarized light source 105 is incident on the GPH element 110, which implements a lens phase profile, and is also referred to herein as a geometric phase lens. The geometric phase lens 110 diffracts the incident light into focused 111 or defocused 112 beams having orthogonal circular polarization states RCP (right-handed circularly polarized) or LCP (left-handed circularly polarized), where the angle of divergence between the beams differs based on the local optical axis orientation. The geometric phase lens 110 focuses one circular polarization (here, RCP) onto a focal spot or a line 117 on a region 130 at or near a focal length $f$, providing converging (e.g., a convex) lens effect, while defocusing the orthogonal circular polarization (here, LCP) to wider angles, providing a diverging (e.g., a concave) lens effect. This results in a polarization-dependent intensity at or near a focal length distance away from the geometric phase lens 110.

The PR element 120 provides at least one region 125a, 125b that is configured to provide a positive retardation (e.g., quarter-wave) to convert one circular polarization to a target output polarization (e.g., linear), and at least one other region 130 that is configured to provide a different or negative retardation to convert the orthogonal circular polarization to the same target output polarization. In some embodiments, the output light can thereby be nearly fully polarized with a single or same desired polarization; however, it will be understood that, in practice, less than 100 percent of the output light may have the same polarization. In addition, although not illustrated, an optional transparent spacer element may be arranged between the GPH and PR elements, such that a distance between the GPH element 110 and the PR element 120 corresponds to the focal length "$f$" of the GPH element 110. Also, a collimating lens or light guide may be positioned between the light source 105 and the GPH element 110 in some embodiments to control the divergence angle of the light.

FIG. 2A illustrates an example of a spatially varying optical axis profile in a GPH element 210a that defines a one-dimensional lens according to some embodiments described herein, with bars 215a indicating the local optical axis direction/orientation, and Φ(x) indicating the angle of the optical axis orientation 215a as a function of position relative to the x-axis, also referred to herein as the optical axis profile. As shown in FIG. 2A, the optical axis profile Φ(x) varies in a non-linear manner in one dimension along a surface of the element 210a to define a pattern Λ(x). The local period of the pattern Λ(x) varies, where the period at the center is larger than the period of the edge. As an example, the function can be approximately $Φ(x)=kπx^2$, where "k" is a non-zero constant that is related to a focal length of the GPH element 210a. This pattern represents one particular example of a GPH element that functions as a polarization-sensitive cylindrical lens.

FIG. 2B illustrates an example of a spatially varying optical axis profile in GPH element 210b that defines a two-dimensional lens according to some embodiments described herein with bars 215b indicating the local optical axis direction, and Φ(x,y) indicating the angle of the optical axis orientation 215b relative to the x-axis. As shown in FIG. 2B, the optical axis profile $Φ(x, y)=k\ π(x^2+y^2)$ varies non-linearly in two-dimensions along a surface of the element 210b. The GPH element 210b of FIG. 2B may act as polarization-sensitive spherical lens. Both of the examples of FIGS. 2A and 2B, as well as other examples with similar focusing/defocusing properties, may be referred to as geometric phase (GP) lenses. It will be understood that while some GPH optical axis profiles are fully continuously varying, such as those discussed with reference to FIGS. 2A-2B, others may have continuous variations within regions and discrete boundaries in-between regions.

As shown in the examples of FIGS. 2A and 2B with non-linear optical axis profiles, a GPH element 210a or 210b can be considered a more complex version of a standard polarization grating (PG), having a one- or two-dimensional variation of its grating period along a surface thereof. The local optical axes of a GPH element may also vary in a third dimension (e.g., over a thickness thereof), for example, in embodiments where the GPH element is a chiral liquid crystal layer having a molecular structure that is rotated over the thickness thereof.

FIGS. 3A and 3B illustrate examples of the spatially varying optical axis profile of PGs 310a, 310b. In particular, FIG. 3A illustrates a PG 310a having an optical axis variation (indicated by bars 315a) and diffraction in the x-direction, while FIG. 3B illustrates a PG 310b having an optical axis variation (indicated by bars 315b) and diffraction in the y-direction. As shown in FIGS. 3A and 3B, a PG 310a or 310b may be considered a particular example of a GPH that instead implements a linear phase profile, e.g., $Φ(x)=πx/Λ$ or $Φ(y)=πy/Λ$, where Λ is the constant grating period.

FIGS. 4A and 4B illustrate examples of patterned retarder elements 420a, 420b according to embodiments of the present invention as described herein. The patterned retarder element 420a or 420b is a birefringent element having two or more different retardation regions (also referred to herein as 'domains' or 'zones'), within each of which the optical axis orientation is uniform but different from surrounding regions. As such, each retardation region is configured to alter the polarization state light passing therethrough differently. The different retardation regions may be positioned side-by-side in a coplanar arrangement. The optical axes of the retardation regions may be orthogonal in some embodiments.

In particular, FIG. 4A illustrates an example optical axis profile for a patterned retarder element 420a with one central linear retardation region 430a having optical axes oriented at −45° and surrounding retardation regions 425a having optical axes oriented at +45°, suitable, for example, for use with the one-dimensional geometric phase lens of FIG. 2A according to some embodiments described herein. FIG. 4B illustrates an example optical axis profile for a patterned retarder element 420b with a central "spot" retardation region 430b having optical axes oriented at −45° and a surrounding retardation region 425b having optical axes oriented at +45°, suitable, for example, for use with the two-dimensional geometric phase lens of FIG. 2B according to some embodiments described herein.

The retarder element 420a or 420b can be configured and arranged relative to a GPH such that different lens regions of the GPH element concentrate or otherwise direct light on a different one of the domains (+45°, −45°). For example, in FIGS. 4A and 4B, the sizes and/or shapes of the −45° retardation regions 430a or 430b may be configured based on the size of the focal spot produced by the portion of the GPH element that provides the convex lens effect when the patterned retarder element 420a or 420b is positioned at or near the focal length f of the GPH element.

In some embodiments, regions of the retarder elements as described herein may be implemented using a multi-layer retarder including first and second retarder layers having different twists, as described for example in U.S. patent application Ser. No. 13/646,166, the disclosure of which is incorporated by reference herein. In particular, the retarder element may include a stacked structure including first and second chiral liquid crystal layers of opposite handedness. Retarders described herein may accomplish a polarization change via optical rotation or birefringence retardation, or any combination thereof, but may not significantly affect or alter the direction of propagation of light passing therethrough. In contrast, some regions of GPH elements described herein can provide diffraction (i.e., changing of the propagation direction) of the light passing therethrough.

Figure 5A:
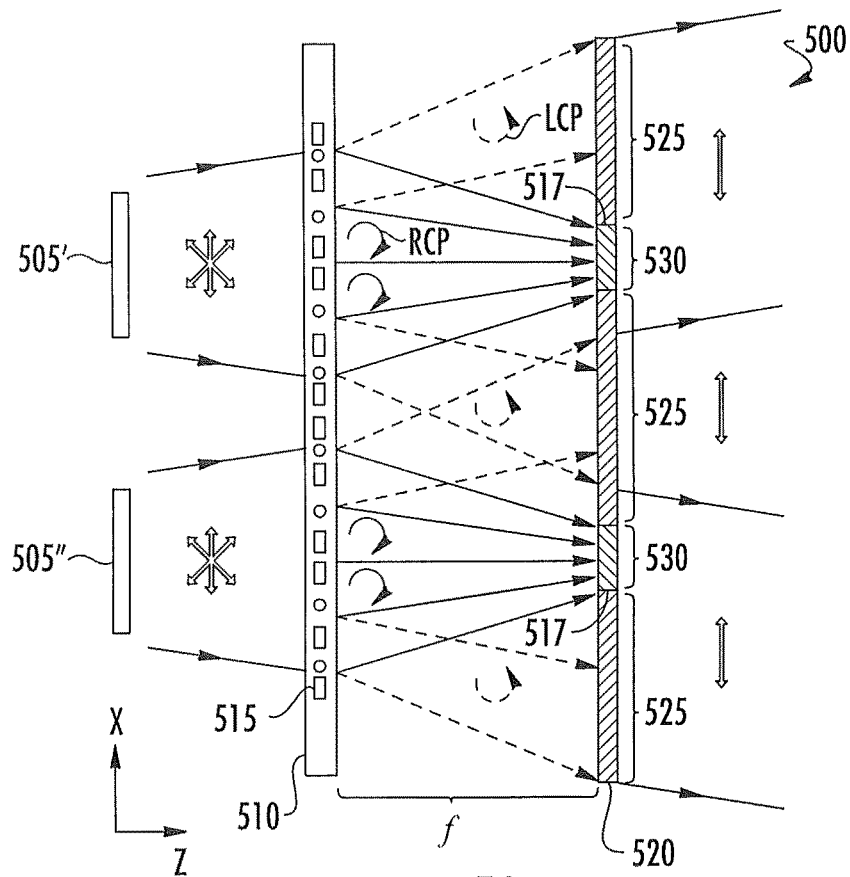
FIGS. 5A and 5B illustrate plan and perspective views, respectively, of a geometric phase hologram polarization conversion system (GPH-PCS) arrangement with a plurality of light sources, according to some embodiments described herein.
Figure 5B:
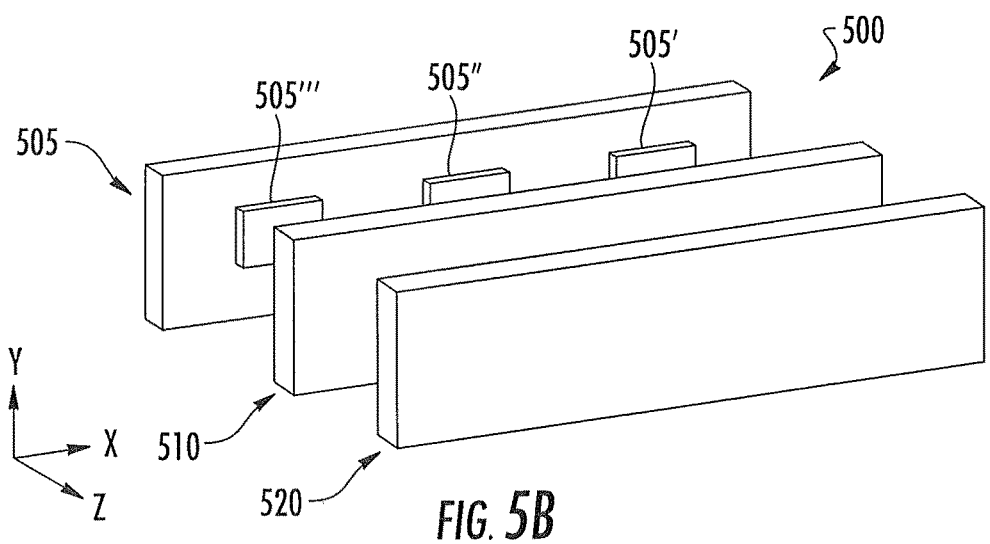

FIGS. 5A and 5B illustrate plan and perspective views, respectively, of a geometric phase hologram polarization conversion system (GPH-PCS) arrangement 500 with a plurality of light sources 505 (including 505', 505", 505'''), according to some embodiments described herein. As shown in FIGS. 5A and 5B, a single GPH element 510 may include multiple portions that provide a convex lens effect, and each of the portions of the GPH element 510 providing the convex lens effect is aligned or otherwise positioned to focus light received from a respective light source 505', 505", thereby creating respective focal spots 517 of a same (shown as circular) polarization at the focal plane. The PR element 520 is positioned at or near the focal distance f to receive the light output from the GPH 510, and includes respective retardation regions 530 aligned with the focal spots 517 to accomplish the conversion of the polarized light output from the GPH element 510 to a same polarization state (shown as linear polarization) as described herein. Although illustrated with reference to discrete retardation regions 525, 530 having optical axes oriented at different angles), it will be understood that some overlap between neighboring retardation regions 525, 530 may be present in the PR element 520. In some embodiments, the number/quantity of lenses defined by the GPH element 510 may correspond to the number/quantity of light sources 505', 505", 505'''; however, embodiments of the present invention are not limited thereto, and the GPH element may include any number of lenses relative to the number of light sources.

Figure 6:
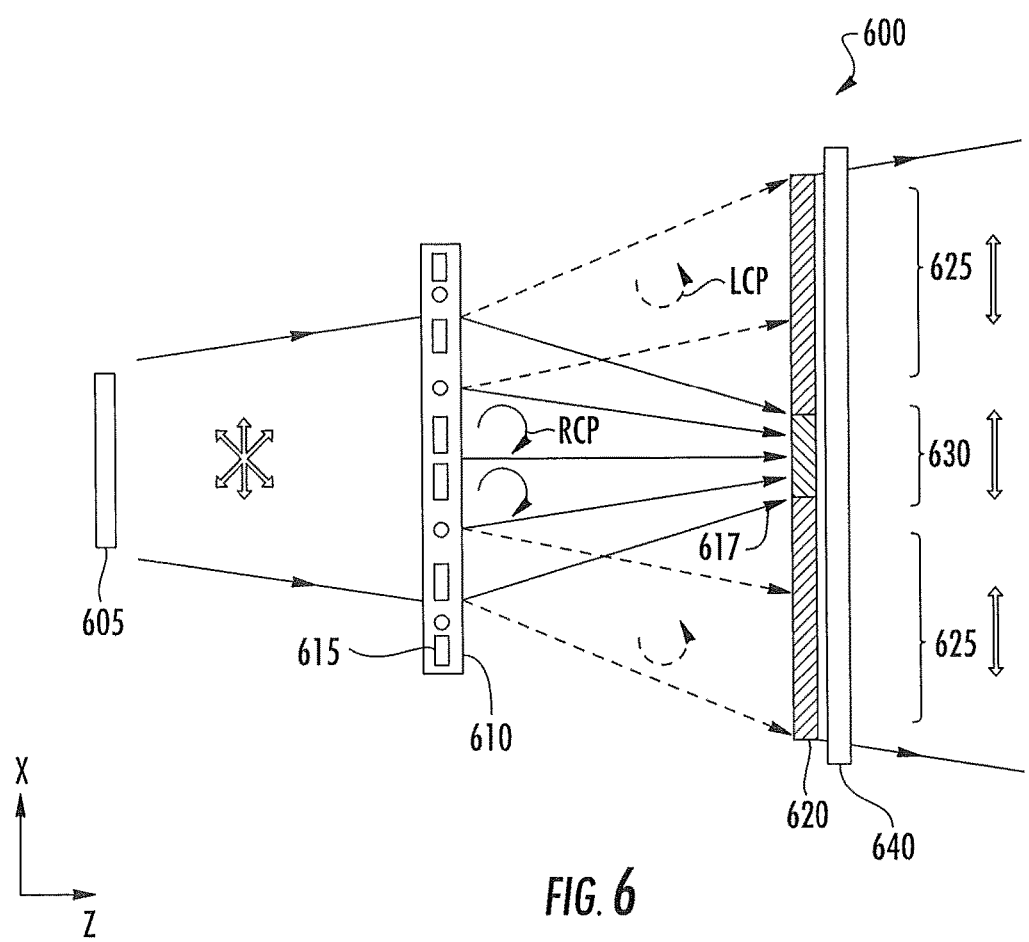
FIG. 6 illustrates a GPH-PCS arrangement according to FIG. 1 and further including an additional polarizer according to some embodiments described herein.

FIG. 6 illustrates a GPH-PCS arrangement 600 similar to FIG. 1 but further including an added polarizer 640 according to some embodiments described herein. As shown in FIG. 6, a polarizer 640 is arranged after (e.g., to receive light output from) the PR element 620. In particular, light output from the one or more light sources 605 propagates through the GPH 610 to create focal spots 617 at the focal plane, at or near which the PR element 620 is positioned, in manner similar as discussed above with reference to FIG. 1. The light output from the respective regions 625, 630 of the PR element 620 propagates through the additional polarizer 640 (for example, a linear polarizer as often used in LCDs), which can "clean up" the output polarization by removing residual light having a polarization state different than the target or desired polarization state.

Figure 7A:
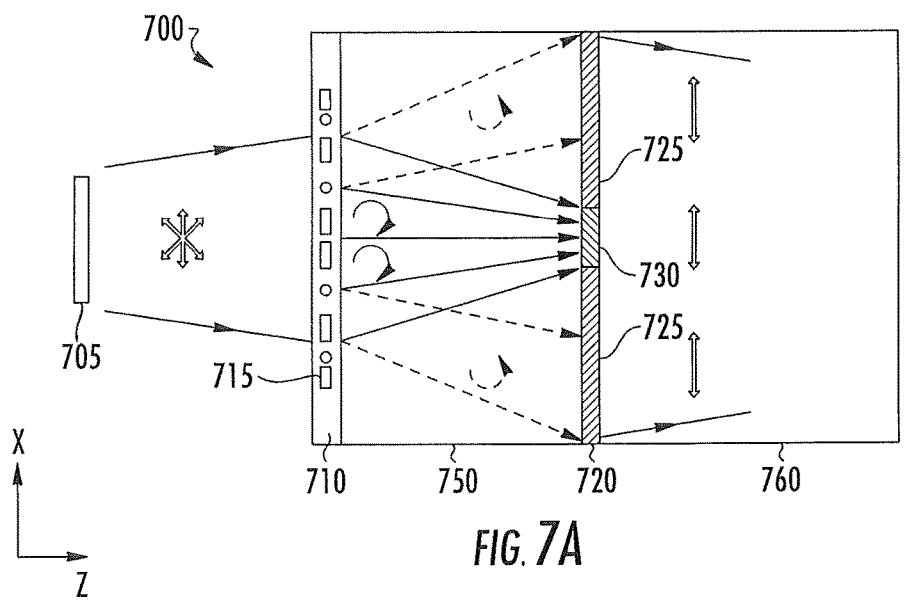
FIGS. 7A and 7B are plan and perspective views, respectively, illustrating a GPH-PCS arrangement according to FIG. 1 and further including a light guide and a spacer according to some embodiments described herein.
Figure 7B:
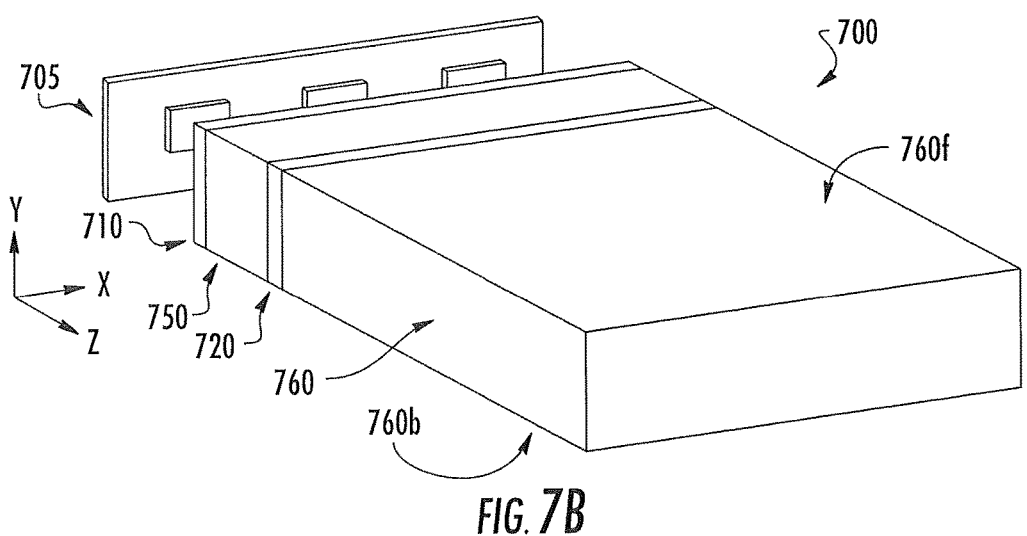

FIGS. 7A and 7B are plan and perspective views, respectively, illustrating a GPH-PCS arrangement 700 including an added light guide 760 and spacer 750 according to some embodiments described herein. As shown in FIG. 7A, the spacer 750 is a transparent element arranged between the GPH element 710 and the PR element 720. Light output from the one or more light sources 705 propagates through the GPH 710, the spacer 750, and the PR element 720. The light guide 760 is arranged at the output of the PR element 720. The light guide 760 may be a transparent element that receives the light that is output from the PCS 700 at an edge thereof adjacent to the PR 720, and guides the light throughout its volume using the principle of total-internal-reflection, so that it may be controllably emitted out of its front surface 760f or back surface 760b, as shown in FIG. 7B. The light emission may be as spatially uniform as is practical.

The light guide (or "slab") 760 may be a flat or planar plate with constant thickness, or may have a wedge or other shape where its thickness varies. The embodiments of FIGS. 7A and 7B provide no limitation as to the out-coupling from the light guide 760; however, in some embodiments the light guide may be configured to substantially maintain the polarization of the light propagating therethrough (for example, a zero-birefringence light guide). The light guide may also include structures and/or materials that direct light out from the light guide and/or from one end to the other, while maintaining the polarization thereof upon exit from the light guide. Such structures and/or materials may include, for example, prisms, microlenses, planar thin films, and/or zero-birefringence polymers or resins. When employed in a direct-view display system, the pixel module may be arranged between the viewer and the light guide 760, and the source 705/PCS 700/light guide 760 system may provide a "backlight" for the display system. Alternatively, the light guide 760 may be arranged between the viewer and the pixel module, providing a "frontlight" for the display system. When used as a frontlight, an optional transparent spacer element 750 may also be arranged between the GPH and the PR, as illustrated in FIGS. 7A and 7B. Also, the polarizer 640 shown in FIG. 6 may be included and positioned between the PR element 720 and the light guide 760. Some embodiments including light guides as described herein may be referred to as an "edge-lit PCS" or "edge-lit GPH-PCS".

FIGS. 8-11 illustrate GPH-PCS arrangements according to some embodiments of the present invention, which include additional elements positioned before the PR element (for example, to receive orthogonal circular polarizations output from the GPH element), and/or other equivalent elements (such as prisms, lens arrays etc.) positioned after the PR element.

Figure 8:
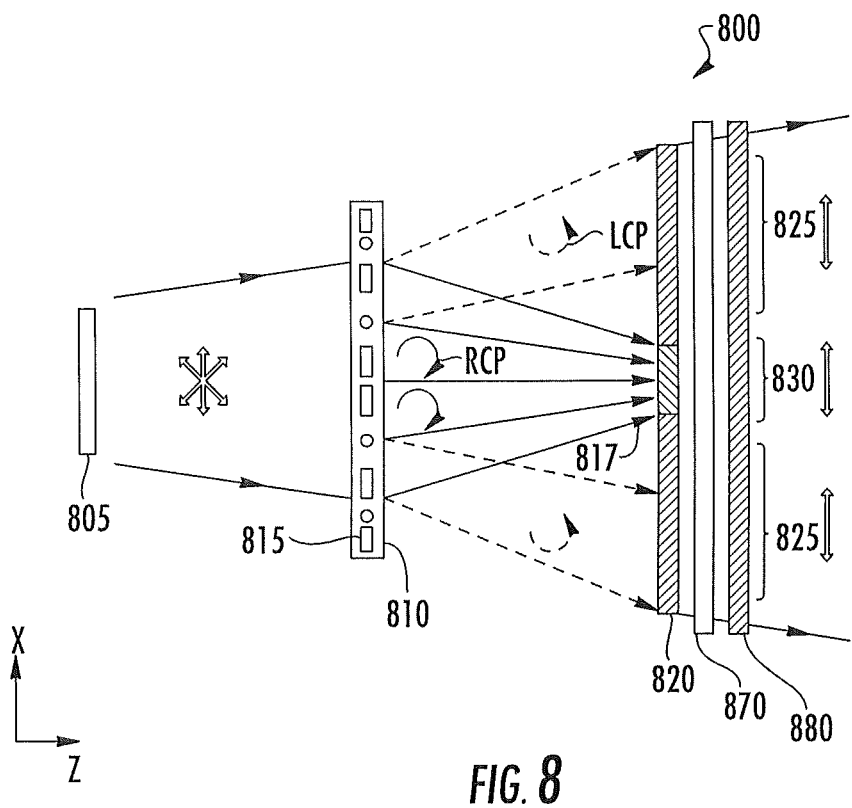
FIG. 8 illustrates a GPH-PCS arrangement according to FIG. 7 and further including a polarization grating (PG) and quarter-wave (QW) retarder according to some embodiments described herein.

In particular, FIG. 8 illustrates a GPH-PCS arrangement 800 similar to FIG. 1 or 7, but further including an additional polarization grating (PG) element 870 and quarter-wave (QW) retarder element 880 according to some embodiments described herein. In FIG. 8, the light guide and spacer elements 760 and 750 of FIG. 7 may also be included in similar positions, but are not shown for clarity. As shown in FIG. 8, light output from the one or more light sources 805 propagates through the GPH 810 to create focal spots 817 at the focal plane, at or near which the PR element 820 is positioned. The PG element 870 is arranged to receive the light output from the PR element 820, and is followed by monodomain retarder element 880 (for example, configured to provide QW retardation). In this embodiment, the PR element 820 is configured to provide half-wave retardation (rather than the quarter-wave retardation discussed above) in at least one region 825/830. The PG element 870 may correspond to the PG 310b shown FIG. 3B, with its optical axis variation in the y-direction. Accordingly, the PG element 870 receives circularly polarized light that is output from the half-wave retardation region(s) of the PR element 820, and diffracts the circularly polarized light in the out-of-plane dimension (i.e., normal to the page), thereby adding a chromatic angular dispersion. The QW retarder element 880 receives the chromatically separated circularly polarized light that is output from the PG element, and converts it to the target or desired polarization state (shown as linear polarization).

Figure 9:
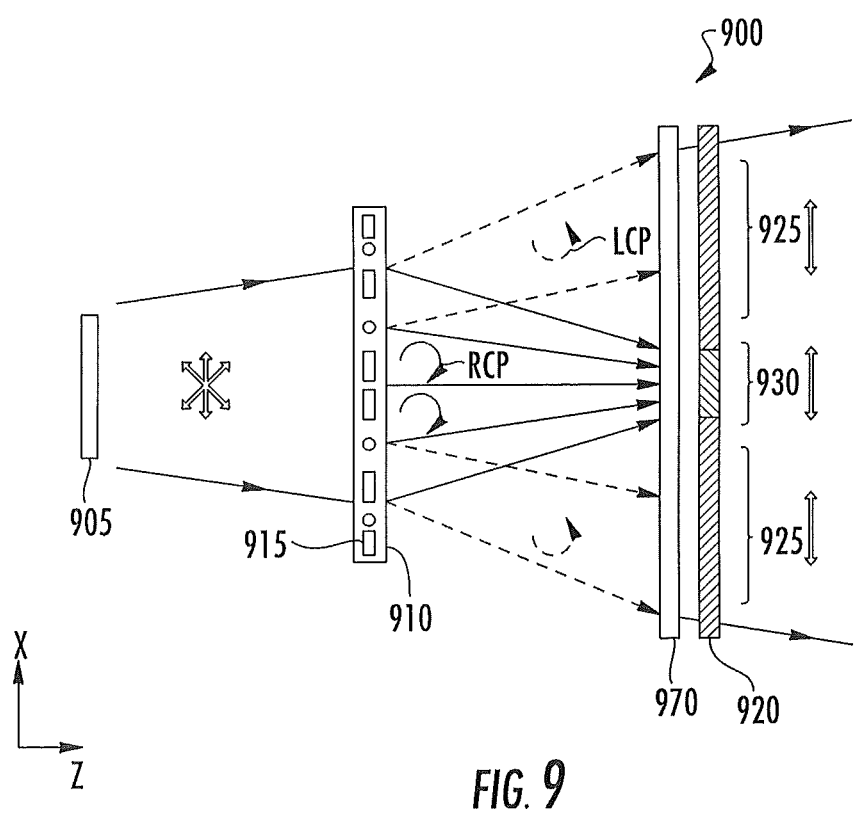
FIG. 9 illustrates a GPH-PCS arrangement according to FIG. 7 and further including a polarization grating (PG) preceding the patterned retarder (PR) according to some embodiments described herein.

FIG. 9 illustrates a GPH-PCS arrangement 900 similar to FIG. 1 or 7, but further including a PG element 970 positioned before (e.g., to provide light output to) the PR element 920 according to some embodiments described herein. In FIG. 9, the light guide 760 and spacer 750 elements of FIG. 7 may also be included in similar positions, but are not shown for clarity. As shown in FIG. 9, a GPH element 910 is arranged to receive light from a light source 905, and a PG element 970 is arranged or positioned to receive the light output from the GPH element 910, such that the PR element 920 receives the polarized light output from the PG element 970. The PG element 970 may correspond to the PG 310b shown FIG. 3B, with its optical axis variation in the y-direction. In particular, the PG element 970 receives the focused and defocused light having orthogonal circular polarizations from the GPH element 910, and diffracts the light of orthogonal circular polarizations in the out-of-plane dimension (i.e., normal to the plane of the illustration), thereby adding a chromatic angular dispersion. The PR element 920, which may be configured to provide quarter-wave retardation in one or more regions 925, 930, receives the chromatically separated circularly polarized light that is output from the PG element 970 and converts it to the target or desired output polarization state, which is shown by way of example in FIG. 9 as linear polarization. Although illustrated primarily herein with reference to PGs having a single domain, it will be understood that PGs having multiple domains/different retardation regions may be used in any of the embodiments described herein.

Figure 10:
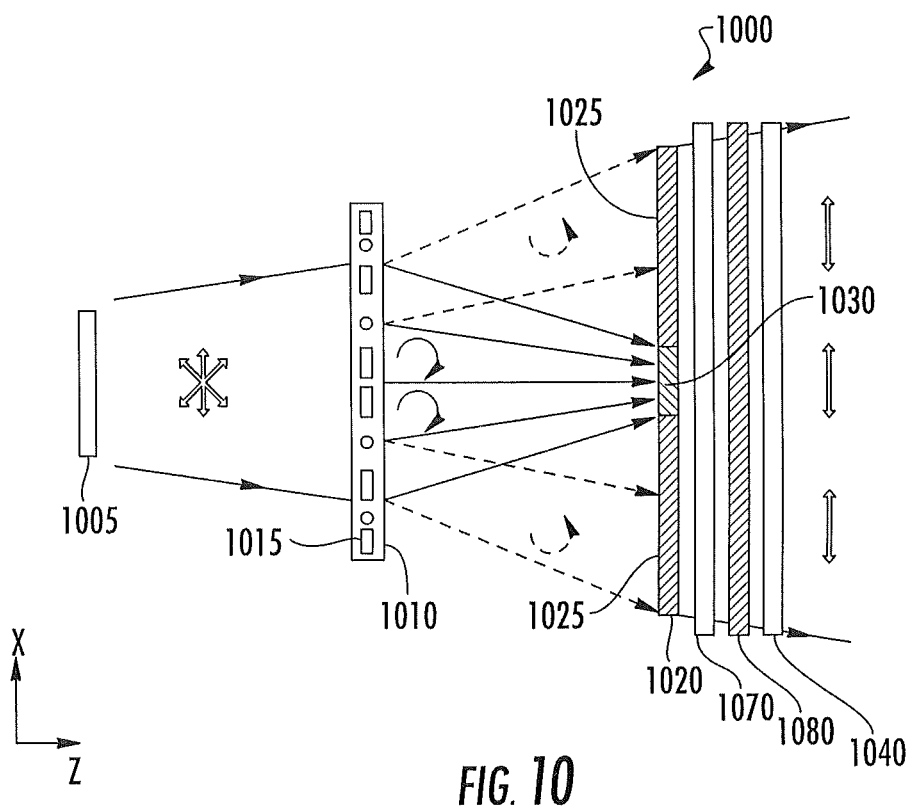
FIG. 10 illustrates a GPH-PCS arrangement according to FIG. 8 and further including an additional polarizer according to some embodiments described herein.

FIG. 10 illustrates a GPH-PCS arrangement 1000 similar to FIG. 8 that further includes an additional polarizer 1040 according to some embodiments described herein. In FIG. 10, the light guide 760 and spacer 750 elements of FIG. 7 may also be included in similar positions, but are not shown for clarity. As shown in FIG. 10, a GPH element 1010 is arranged to receive light from a light source 1005, a PR element 1020 (including different retardation regions 1025, 1030) is arranged to receive light output from the GPH element 1010, a PG element 1070 is arranged to receive the light output from the PR element 1020, and a monodomain retarder element 1080 is arranged to receive the light output from the PG 1070. A polarizer 1040 is arranged after (e.g., to receive light output from) the monodomain retarder 1080 (which may, for example, be configured to provide QW retardation). Accordingly, the light output from the monodomain retarder 1080 propagates through the additional polarizer 1040 (for example, a linear polarizer as often used in LCDs), which can "clean up" the output polarization by removing residual light having a polarization state different than the target or desired polarization state (shown as linear polarization).

Figure 11:
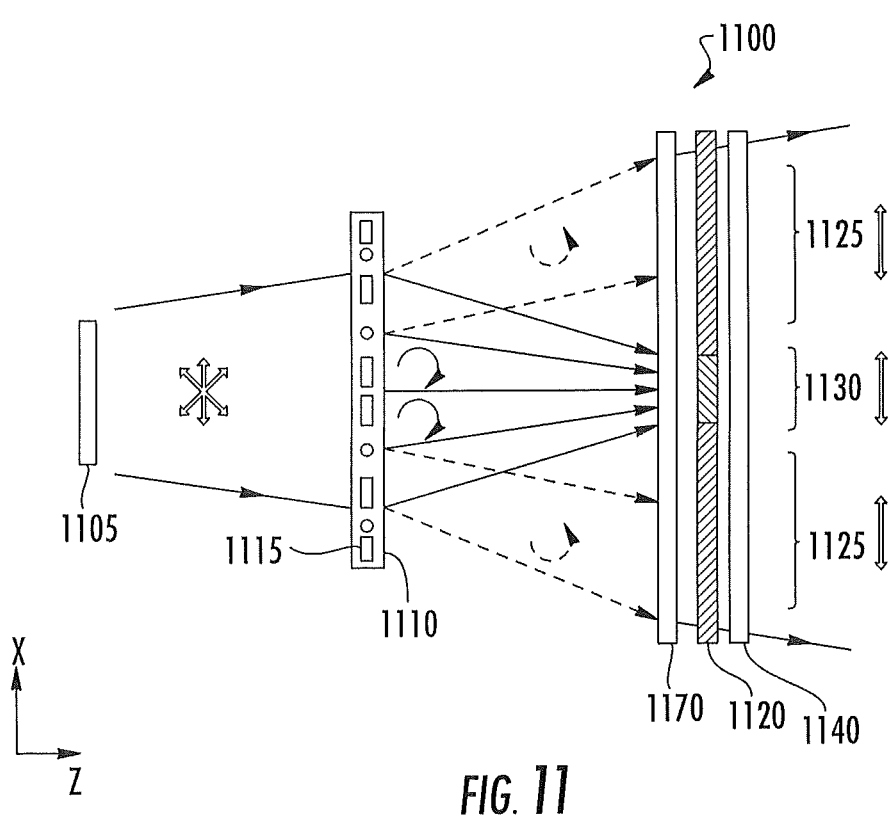
FIG. 11 illustrates a GPH-PCS arrangement according to FIG. 9 and further including an additional polarizer according to some embodiments described herein.

FIG. 11 illustrates a GPH-PCS arrangement 1100 similar to FIG. 9 that further includes an additional polarizer 1140 according to some embodiments described herein. In FIG. 11, the light guide 760 and spacer 750 elements of FIG. 7 may also be included in similar positions, but are not shown for clarity. As shown in FIG. 11, a GPH element 1110 is arranged to receive light from a light source 1105, a PG element 1170 is arranged to receive light output from the GPH element 1010, and a PR element 1120 (including different retardation regions 1125, 1130) is arranged to receive the light output from the PG element 1170. A polarizer 1140 is arranged after (e.g., to receive light output from) the PR element 1120. The addition of the polarizer 1140 (e.g., a conventional linear polarizer as used in LCDs) will clean up the output polarization by removing any residual light with polarization different than the target output polarization. Accordingly, the light output from the PR element 1120 propagates through the additional polarizer 1140 (for example, a linear polarizer as often used in LCDs), to clean up the output by removing residual light having a polarization state different than the target or desired polarization state (shown as linear polarization).

Figure 12:
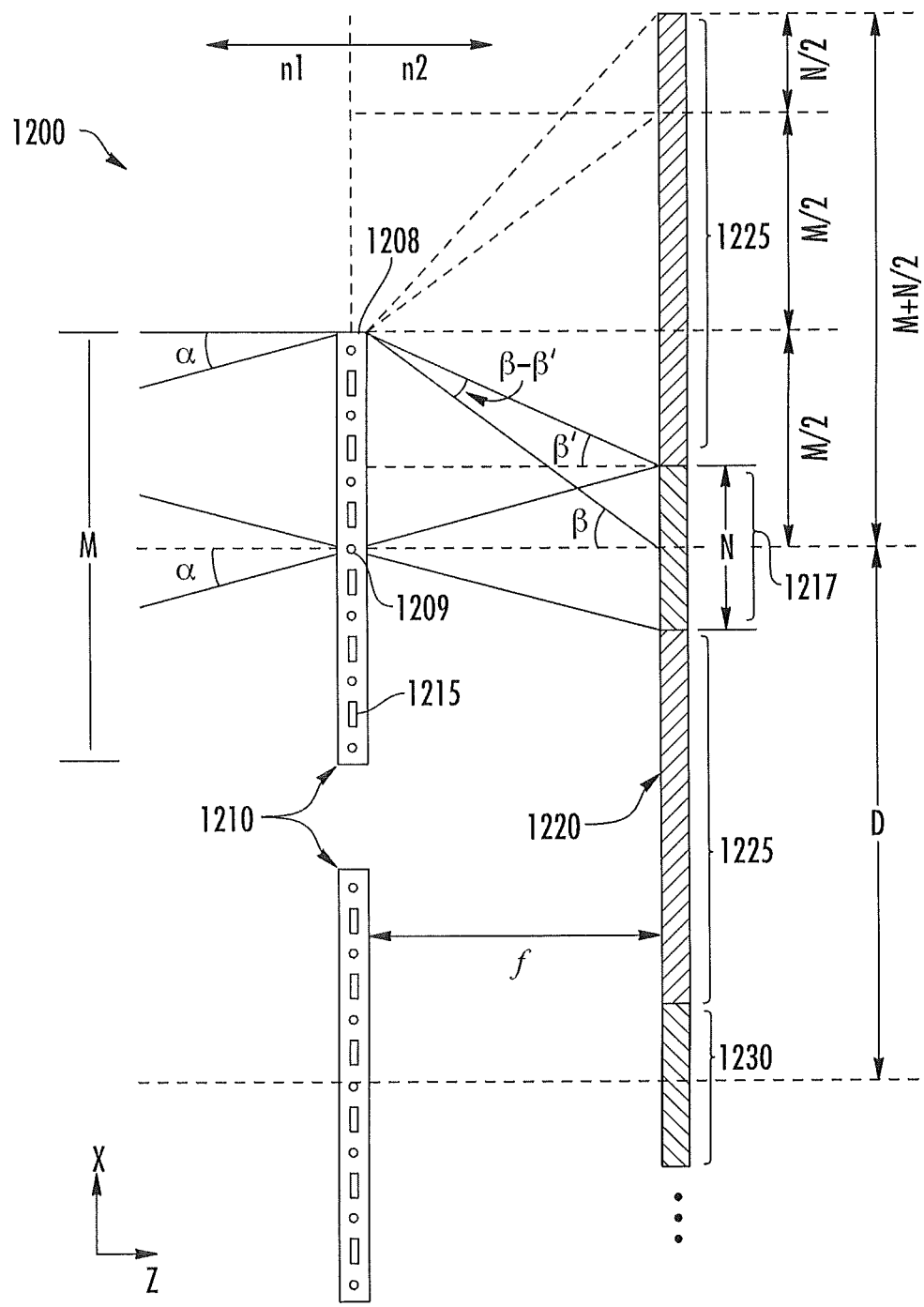
FIG. 12 is a plan view illustrating angle and dimension parameters of an edge-lit GPH-PCS according to some embodiments described herein.

FIG. 12 is a plan view illustrating angle and dimension parameters of an edge-lit GPH-PCS 1200 according to some embodiments described herein. In particular, FIG. 12 illustrates the simulated operation and geometry of the GPH-PCS arrangement of FIG. 7 in greater detail, omitting the spacer 750 and light guide 760 elements for clarity. The parameters shown are estimated in the paraxial approximation, which assumes that an angle made by a ray with an axis of the optical system is small and that rays propagate close to the axis.

Referring now to FIG. 12, when a GPH element 1210 is configured as polarization-sensitive cylindrical lens (i.e., for one-dimensional focusing) as illustrated in FIG. 2A, the period of the pattern defined by the optical axis variation at a central portion 1209 of the GPH element is relatively large as compared to that at an edge portion 1208, so light incident on the central portion 1209 passes directly through without substantial redirection (e.g. without substantially altering the direction of propagation). This geometry defines the length of the focal spot 1217 on region 1230 of the PR element (LWP 1220) with size $N=2f\alpha n_1/n_2$, where $f$ is the focal length and $\alpha$ is the incident light divergence. The variables $n_1$ and $n_2$ indicate the refractive index of the medium outside (e.g., air) and inside (e.g., glass) of the PCS, respectively. The focal spot size N can be defined as $N=2f(\beta-\beta')$, where the angle $\beta=M/2f$ and the angle $\beta'=-n_1\alpha/n_2+\lambda c/(\Lambda \min n_2)$ derived by the grating equation, where $\Lambda_{min}$ is the minimum grating period and M is the diameter of the lens defined by the central portion 1209 of the GPH element 1210. Therefore the minimum period of the GPH 1210 can be derived as follows: $\Lambda_{min}=2f\lambda c/(n_2M)$, where $\lambda c$ is the center wavelength of the input light (e.g., 550 nm). For example, if M=3.2 mm, $\alpha=\pm15°$, $n_1=1$, and $n_2=1.5$, the focal length and f-number (e.g., the ratio of the focal length $f$ to the diameter M) of the geometric phase lens 1210 can be estimated for various minimum periods as shown in FIG. 13 and FIG. 14.

Similar reasoning can be applied with respect to the two-dimensional spherical geometric phase lens 210b illustrated in FIG. 2B.

Figure 13:
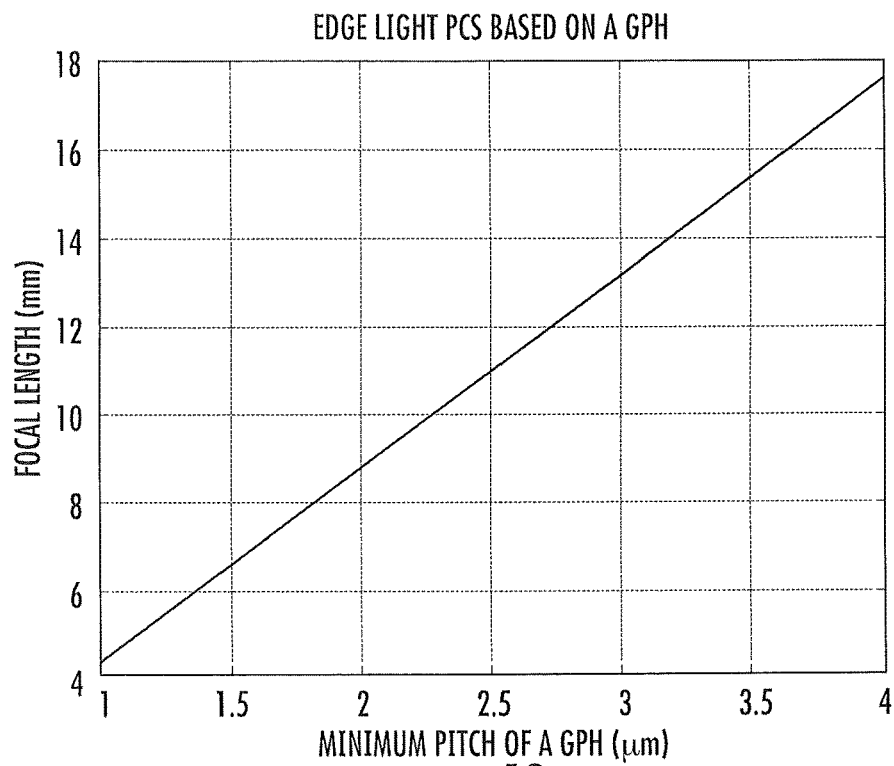
FIG. 13 is a graph illustrating focal length estimation of a geometric phase lens according to some embodiments described herein.
Figure 14:
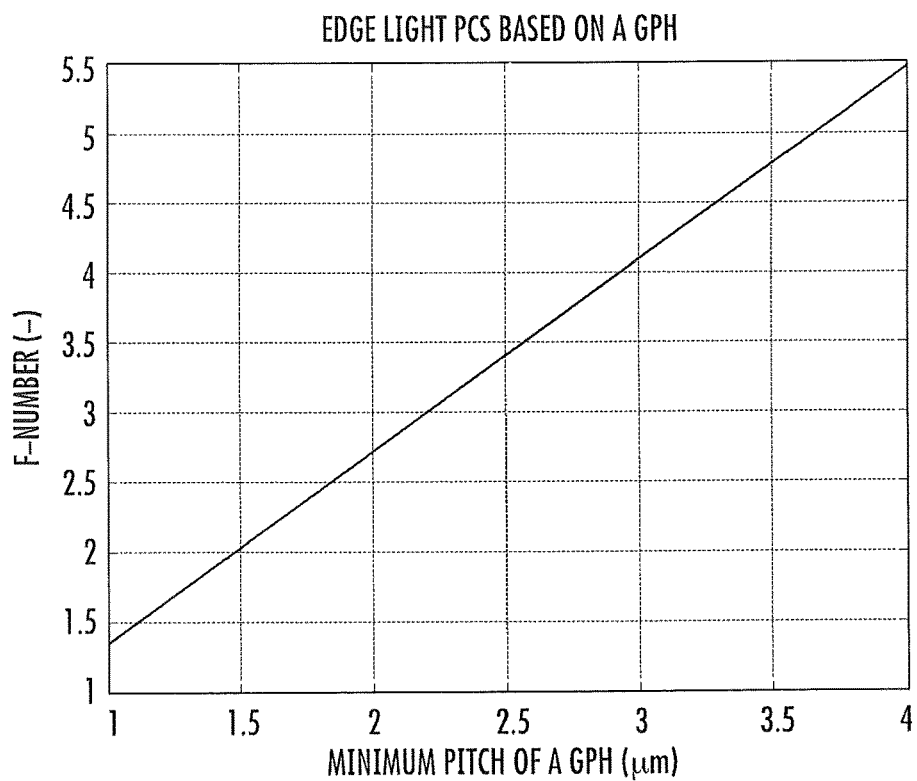
FIG. 14 is a graph illustrating f-number estimation of a geometric phase lens according to some embodiments described herein.

FIG. 13 is a graph illustrating focal length estimation of a geometric phase lens according to some embodiments described herein. FIG. 14 is a graph illustrating f-number estimation of a geometric phase lens according to some embodiments described herein. As shown in FIGS. 13 and 14, the focal length $f$ and the f-number $f/M$ linearly increase as the pitch or period $\Lambda$ of the pattern defined by the varying local optical axis orientation of the GPH element increases.

Figure 15:
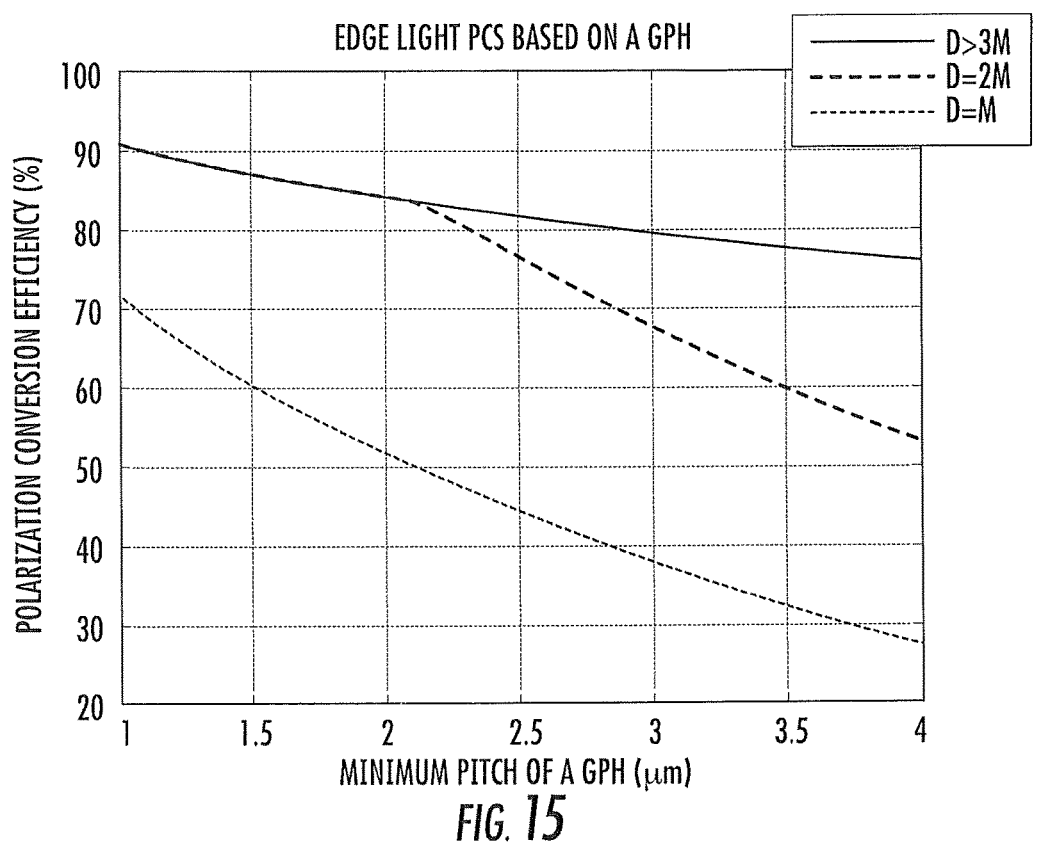
FIG. 15 is a graph illustrating polarization conversion efficiency estimation for various embodiments described herein.

FIG. 15 is a graph illustrating polarization conversion efficiency estimation for several minimum periods defined by the varying optical axis orientations of a GPH element described herein. In particular, FIG. 15 shows the conversion efficiency for three cases: (i) D>3M, (ii) D=2M, and (iii) D=M, where D is a distance between the centers of the light sources (e.g., LEDs) and M=3.2 mm as in the example described above. The results illustrate that a conversion efficiency of about 86% or more can be achieved when D=2M and the minimum period $\Lambda$ min is approximately 1.5 μm. However, it will be understood that the graph of FIG. 15 is based on a theoretical (or "perfect") optical system with 100% diffraction efficiency of the GPH and 100% polarization conversion efficiency of the patterned retarder.

Figure 16A:
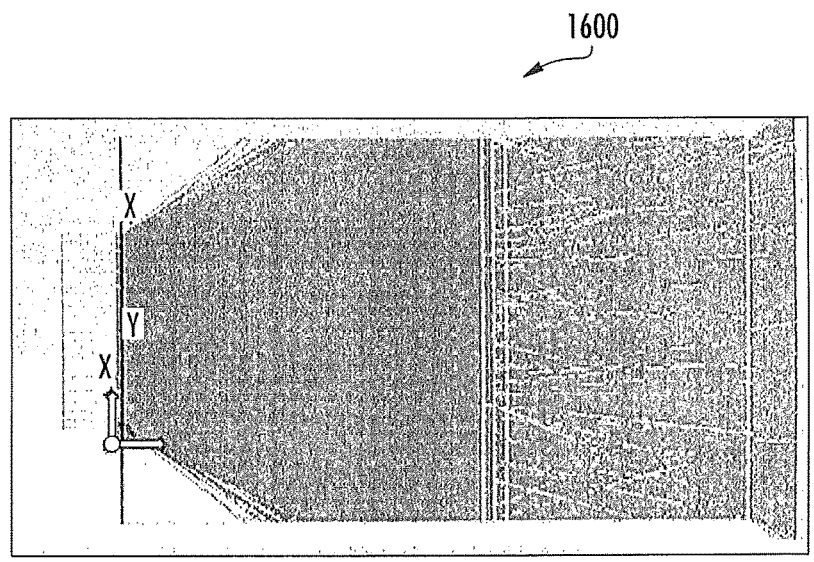
Figure 16B:
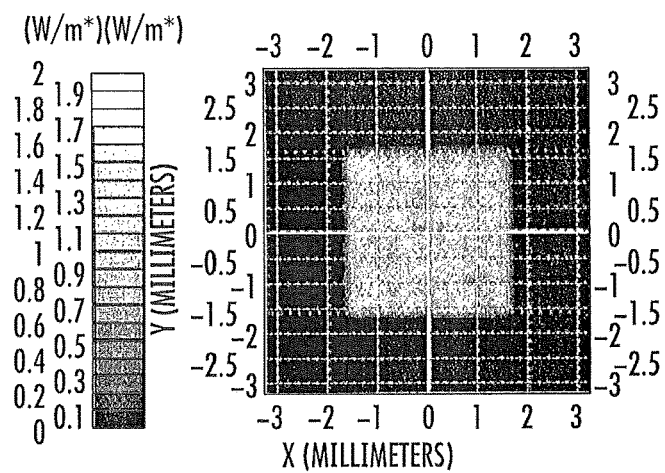
FIGS. 16B and 16C illustrate an irradiance map and graph of the unpolarized input used for the simulation, respectively, according to some embodiments described herein.
Figure 16C:
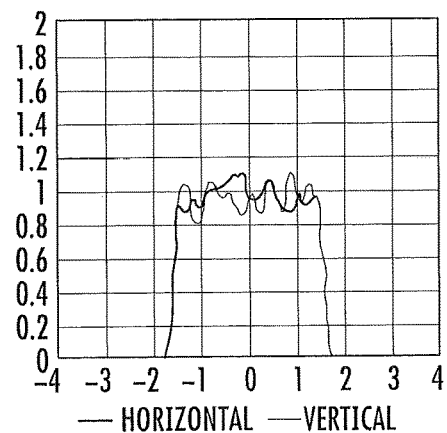

FIG. 16A illustrates a simulation of a model geometry 1600 corresponding to the GPH-PCS arrangement of FIG. 7A, with the source at left and light guide at right, while FIGS. 16B and 16C illustrate an irradiance map and graph, respectively, of the unpolarized input light source used in the simulation, at the "front surface" (e.g., on which the input light is incident) of the GPH according to some embodiments described herein. As shown in FIG. 16A, the GPH-PCS arrangement of FIG. 7A was modeled within a commercial ray-tracing simulation tool. FIGS. 16B and 16C illustrate characteristics of the unpolarized light source with ±15° (in-plane)×±10° (out-of-plane) divergence angle that filled the area of the edge-lit GPH-PCS at is input face, and 3.2 mm thick and 6.4 mm wide light guide with perfect mirror sides, imitating a periodic array of the light source (e.g., LEDs). The light source was positioned immediately before the GPH.

In FIGS. 16A-16C, the GPH element was modeled as polarization-sensitive cylindrical lens whose minimum period was set at 1.5 μm, estimated focal length was approximately 6.5 mm, and f-number was approximately 2. The simulation included 1-4% zero-order leakage, varying across the area of the GPH element. A PR element with two different regions having quarter-wave retardation with orthogonal optical axes (e.g., ±45°) was positioned approximately 6 mm from the GPH element. The inner −45° region was approximately 2.4 mm wide, and the outer +45° regions were (in total) approximately 4 mm wide, half on each side of the inner region. The GPH and PR elements were aligned and optically laminated with a spacer (and, in the present example, no other optical elements) between them, as illustrated in FIG. 7A.

The simulation confirmed that the GPH element focuses approximately half of the unpolarized input light toward the focal spot, where the inner −45° region of the patterned retarder is positioned, and the other half of the light diverges toward all regions of the patterned retarder element. The inner region of the patterned retarder element converts the polarization state of the focused light into a linear polarization, and the outer regions of the patterned retarder element convert the polarization state of the diverged light into the same linear polarization. However, the polarization state of the diverged light passing through the inner region of the patterned retarder is converted into an orthogonal linear polarization, which causes incorrect polarization output that reduces the polarization conversion efficiency. In order to estimate the conversion efficiency, a perfect linear polarizer (i.e., with infinite extinction ratio and no loss along the polarizer transmission axis) was simulated and positioned after the edge-lit GPH-PCS, and the emitted flux at the back surface of the light guide was examined. The resulting output was linearly polarized with approximately 72% correct polarization, with a spatial profile shown in FIGS. 17B-17C.

Figure 17A:
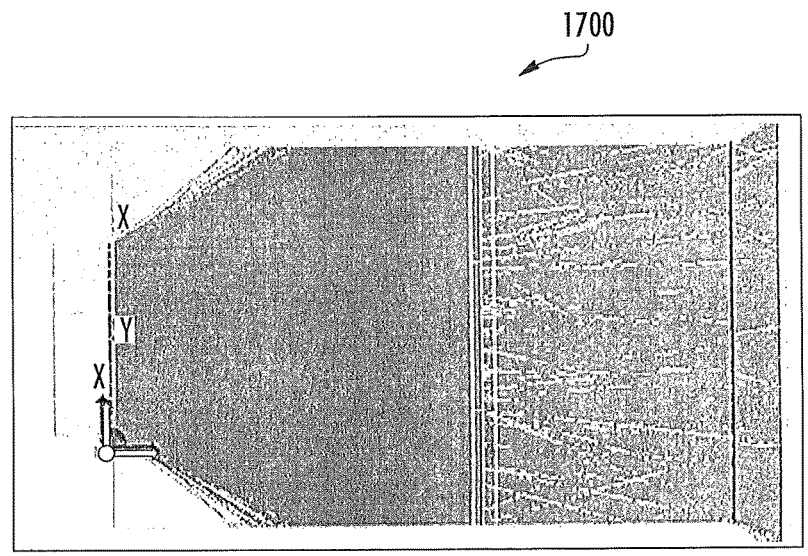
Figure 17B:
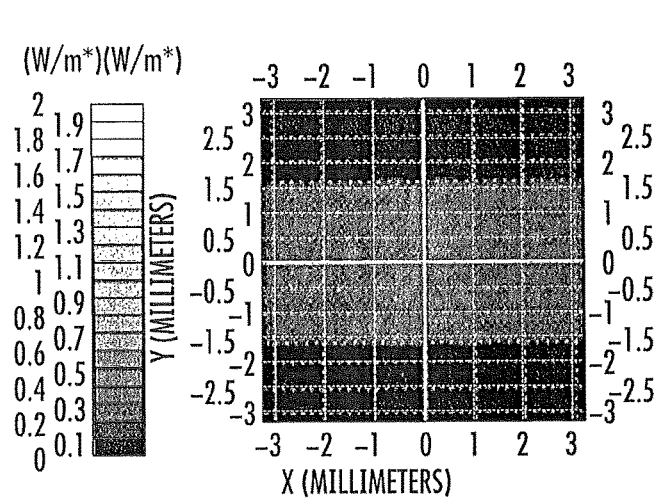
FIGS. 17B and 17C illustrate an irradiance map and graph of the linearly polarized output resulting from the simulation, respectively, according to some embodiments described herein.
Figure 17C:
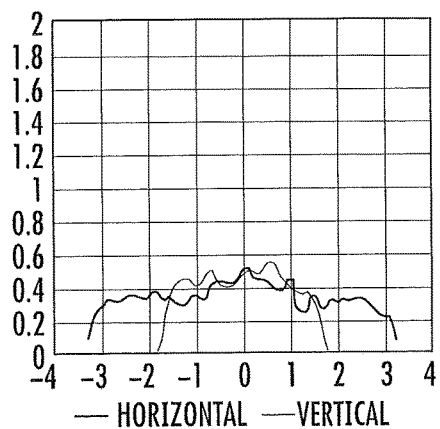

FIG. 17A illustrates a simulation of a model geometry 1700 corresponding to the GPH-PCS arrangement of FIG. 7A, with the source at left and light guide at right, while FIGS. 17B and 17C illustrate an irradiance map and graph, respectively, of the linearly polarized output, at the "back surface" of the light guide (i.e., labeled as an "integration block") approximately 4 mm after the polarizer. In several embodiments described herein, the beams output from the GPH element are orthogonal circularly polarized, and are converted to linear polarization by a patterned retarder with quarter-wave retardation with optical axes about 90° apart (as shown for example in FIGS. 4A and 4B). However, it will be understood that this result could alternately be achieved by arranging a monolithic quarter-wave retarder element after the GPH, to first convert it to orthogonal linear polarizations, and by using an alternate patterned retarder with one region with a half-wave retardation and the other with zero effective retardation. More generally, it will be understood that embodiments of the present invention include any combination of monolithic and patterned retarders that can be arranged to receive two orthogonally polarized beams from a GPH and output a single, or nearly single, polarization state, to achieve the same or similar results as discussed above with respect to particular embodiments having a single patterned retarder.

In some embodiments, one or more of the GPH-PCS elements described herein can be used as a backlight or frontlight for a flat-panel display, including, but not limited to, liquid crystal displays (LCDs), interferometric modulator displays based on micro-electro-mechanical-system (MEMS) such as Mirasol®, and electrophoretic displays such as E Ink. When embodiments of the present invention are used as a backlight within an LCD, it may be referred to as the "backlight unit" (BLU), and may provide brightness enhancement in the display system by efficiently converting the unpolarized light into polarized light before providing the light to the LC panel. Some embodiments including light guides as described herein may be referred to as an edge-lit backlight unit (BLU) with a GPH-PCS, or more simply, a GPH-BLU. When embodiments of the present invention are used as a frontlight for a reflective flat-panel-display, the frontlight may efficiently provide brighter illumination to the display, augmenting the light received from the ambient environment, while also reducing or avoiding degradation of the contrast ratio. Embodiments of the present invention may be used in flat-panel displays of any and all sizes.

In some embodiments, one or more of the GPH-PCS elements described herein can be used within a light engine for a projector using a microdisplay, including, but not limited to, liquid-crystal-on-silicon (LCOS) and digital-micro-mirror (DMD) displays such as DLP™. The output of the GPH-PCS may be directed onto a polarizing beam splitter (PBS) cube (e.g., MacNeille, etc), which can then illuminate a reflective or transmissive microdisplay, followed by a projection lens. It will be understood that this is a non-limiting example, and that many combinations of the polarizing element, microdisplay, and projection lens are known by those skilled in the art of projection system design.

In some embodiments, one or more of the GPH-PCS elements described herein can be used within optical fiber systems, to accomplish a similar purpose of accepting light with diverse and unpredictable polarization and converting the light into a single desired polarization. In telecommunication systems, naturally present light with diverse polarizations, which can be quantified as polarization mode dispersion (PMD), can lead to loss, lower communication bandwidths, and/or increased complexity and cost of hardware. Accordingly, infrared light from a single-mode or multi-mode optical source (such as an optical fiber) may be directed through and expanded by a collimator and then arranged to pass through the GPH-PCS element. The GPH-PCS element may be used to convert the incident light to a known, uniform, and fixed polarization, which may then be directed into various subsequent components used in telecommunications, including amplifiers, attenuators, filters, or a second collimator into a second optical fiber.

It will be understood that, as described herein, the terminology "retarder" and "waveplate" may be used interchangeably to refer to any optical element that provides retardation of light passing therethrough, and the following additional terms are also to be considered equivalent, unless otherwise indicated: "retardation plate," "compensation film," and "birefringent plate" that is uniaxial, biaxial, or inhomogeneous. Retarders as described herein may be broadband (i.e., achromatic) or narrowband (i.e., chromatic).

It will also be understood that anti-reflection coatings may be applied on one or more surfaces that interface with the ambient medium (e.g., air). It will also be understood that the optical elements described herein, including the various combinations of the patterned retarder, polarizer, PG, and/or QW plate, may in some cases be laminated together without an air gap in between them, and in other cases may be arranged with an air gap in between. Also, a microlens array or another GPH may be placed at the output of the embodiments described herein.

It will be further understood that, in some embodiments, the light source can provide elliptically polarized or partially polarized light (e.g. such as that from some laser diode and LED light sources).

Some GPH elements fabricated in accordance with embodiments of the present invention may have a broadband spectrum, using for example the techniques of achromatic PG and MTRs as described in U.S. Pat. No. 8,339,566 and U.S. patent application Ser. No. 13/646,166, the disclosures of which are incorporated by reference herein.

Embodiments of the present invention are described herein with reference to liquid crystal (LC) materials. Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a controllable way.

It will be understood by those having skill in the art that, as used herein, a "transmissive" or "transparent" substrate or element may allow at least some of the incident light to pass therethrough. In other words, transmissive or transparent elements described herein need not be perfectly transparent, and may have isotropic or dichroic absorption characteristics and/or may otherwise absorb some of the incident light. In contrast, a "reflective" substrate as described herein may reflect at least some of the incident light. A transparent substrate or spacer may be a glass substrate in some embodiments. Also, "polymerizable liquid crystals" may refer to relatively low-molecular weight liquid crystal materials that can be polymerized, and may also be described herein as "reactive mesogens." In contrast, "non-reactive liquid crystals" may refer to relatively low-molecular weight liquid crystal materials that may not be polymerized.

Also, as used herein, "zero-order" light propagates in a direction substantially parallel to that of the incident light, i.e., at a substantially similar angle of incidence, and may be referred to herein as "on-axis" light. In contrast, "non-zero-order light," such as "first-order" light, propagates in directions that are not parallel to the incident light, and is referred to herein as "off-axis" light. "Partially collimated" light, as described herein, may describe light rays or beams that propagate substantially parallel to one another, but may have some divergence (e.g., difference in beam diameter with distance from the source).

It will also be understood that embodiments of the present invention are not limited to the particular materials described herein, but may be implemented using any and all material layers that function as described herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In some embodiments, the PR element may be positioned around (e.g., near, rather than at) the focal length $f$ to receive the light output from the GPH. For example, the position of the PR element could be closer to the GP element (e.g., within approximately 50% off) when the input beam is diverging in order to improve or maximize the conversion efficiency. More generally, in some embodiments the position of the PR element could be within approximately +50% of the focal length $f$. However, if the input beam is nearly collimated, the PR element may be placed at the focal length away from the GP element.

In the drawings and specification, there have been disclosed embodiments of the disclosure. Although specific terms are employed, they are used in a generic and descriptive sense only and not for purposes of limitation, the scope of the invention being set forth in the following claims.

That which is claimed:

1. A polarization conversion system, comprising:
    a geometric phase element having local optical axis orientations that vary non-linearly in at least one dimension along a surface thereof, wherein the geometric phase element is configured to diffract at least partially unpolarized incident light into first and second beams having orthogonal polarization states; and
    a retarder element arranged to receive light output from the geometric phase element.

2. The system of claim 1, wherein an optical anisotropy of the geometric phase element has a constant magnitude along the surface thereof.

3. The system of claim 2, wherein the local optical axis orientations define a birefringence pattern having a varying periodicity along the surface of the geometric phase element.

4. The system of claim 3, wherein the varying periodicity defines respective lens regions along the surface of the geometric phase element.

5. The system of claim 3, wherein the periodicity at a central portion of the geometric phase element is greater than the periodicity at an edge portion of the geometric phase element.

6. The system of claim 1, wherein the local optical axis orientations vary in first and second dimensions along the surface of the geometric phase element.

7. The system of claim 1, wherein an area of the surface of the geometric phase element is greater than an area of illumination provided by the incident light.

8. The system of claim 7, wherein the geometric phase element is arranged to receive the incident light directly from an unpolarized light source without an intervening lens element therebetween.

9. The system of claim 1, wherein the first and second beams are divergent, and wherein the geometric phase element is further configured to focus the first beam at a focal length associated therewith and defocus the second beam at the focal length.

10. The system of claim 1, wherein the first and second beams are divergent, and wherein the retarder element is positioned at or near a focal length of the geometric phase element and is configured to convert the orthogonal polarization states of each of the first and second beams to a same polarization state without substantially altering respective directions of propagation thereof.

11. The system of claim 10, wherein the first and second beams have orthogonal circular polarization states of opposite handedness, and wherein the retarder element is configured to convert each of the orthogonal circular polarization states to a same linear polarization state.

12. The system of claim 10, wherein the retarder element includes first and second retardation regions positioned side-by-side or concentrically in a coplanar arrangement, wherein the geometric phase element is configured to direct the first beam to the first retardation region, and to direct the second beam to the second retardation region.

13. The system of claim 12, wherein an area of the first retardation region corresponds to an area of a focal spot at the focal length of the geometric phase element.

14. The system of claim 12, wherein the retarder element comprises a quarterwave plate, and wherein optical axes of the first and second retardation regions are about 90° apart.

15. The system of claim 4, further comprising:
    one or more light sources arranged such that the incident light output therefrom is incident on the geometric phase element,
    wherein each of the light sources is aligned with one of the lens regions of the geometric phase element.

16. The system of claim 15, wherein the light output from the respective lens regions defines respective spots having a same polarization state at a focal plane of the geometric phase element.

17. The system of claim 1, further comprising:
    a polarizing element arranged to receive light output from the retarder element.

18. The system of claim 1, further comprising:
a light guide arranged to receive light output from the retarder element and configured to maintain a polarization of the light output from a surface and throughout a volume thereof.

19. The system of claim 18, wherein the light guide comprises one or more optical structures configured to direct the light output from the retarder element therethrough while maintaining the polarization thereof.

20. The system of claim 19, wherein the optical structures comprise prismatic structures, microlenses, and/or planar thin films.

21. The system of claim 1, further comprising:
a polarization grating arranged between the geometric phase element and the retarder element.

22. The system of claim 1, wherein the retarder element is a halfwave retarder element, and further comprising:
a polarization grating positioned to receive light output from the halfwave retarder element; and
a quarterwave retarder element positioned to receive light output from the polarization grating.

23. The system of claim 1, further comprising:
a transparent spacer element positioned between the geometric phase element and the retarder element,
wherein the geometric phase element, the spacer element, and the retarder element are laminated to provide a monolithic structure.

24. The system of claim 1, wherein the retarder element includes at least one chiral liquid crystal layer.

25. The system of claim 24, wherein the at least one chiral liquid crystal layer comprises first and second chiral liquid crystal layers having respective molecular orientations that are rotated by different twist angles over respective thicknesses thereof, wherein at least one of the twist angles is non-zero.

26. The system of claim 1, wherein the system is included in a projector comprising:
a light source configured to provide at least partially collimated light as the incident light on the geometric phase element;
a microdisplay arranged to receive light output from the retarder element; and
a projection lens arranged to receive light output from the microdisplay.

27. The system of claim 1, wherein the system is included in a lighting unit of a direct view display comprising:
a light emitting element configured to provide unpolarized light as the incident light on the geometric phase element; and
a waveguide arranged to receive light output from the retarder element.

28. The system of claim 1, wherein the system is included in a telecommunications system, comprising:
an infrared light source configured to provide infrared light as the incident light on the geometric phase element; and
an optical fiber element configured to receive light output from the retarder element.

29. A method of fabricating a polarization conversion system, the method comprising:
providing a geometric phase element having optical anisotropy with local optical axis orientations that vary non-linearly in at least one dimension along a surface thereof, wherein the geometric phase element is configured to diffract at least partially unpolarized incident light into first and second beams having orthogonal polarization states; and
arranging a retarder element to receive light output from the geometric phase element.

30. A polarization conversion system, comprising:
a geometric phase element having local optical axis orientations that vary non-linearly in at least one dimension along a surface thereof, wherein the geometric phase element is configured to diffract at least partially unpolarized incident light into first and second beams having different polarization states, and wherein the geometric phase element is configured to focus the first beam at a focal length associated therewith and defocus the second beam at the focal length; and
a retarder element arranged to receive light output comprising the first and second beams from the geometric phase element.

* * * * *